(12) United States Patent
Kerfoot

(10) Patent No.: US 6,817,119 B2
(45) Date of Patent: Nov. 16, 2004

(54) APPARATUS AND METHODS FOR SUBSIDENCE DEEPENING

(76) Inventor: William B. Kerfoot, 49 Ransom Rd., Falmouth, MA (US) 02540

( * ) Notice: Subject to any disclaimer, the term of this patent is extended or adjusted under 35 U.S.C. 154(b) by 0 days.

(21) Appl. No.: 10/056,286

(22) Filed: Jan. 24, 2002

(65) Prior Publication Data

US 2003/0137183 A1 Jul. 24, 2003

(51) Int. Cl.$^7$ .................................................. E02F 3/88

(52) U.S. Cl. ........................................ 37/323; 37/195

(58) Field of Search ........................ 37/307, 317, 318, 37/323, 335, 195

(56) References Cited

U.S. PATENT DOCUMENTS

| | | | | |
|---|---|---|---|---|
| 1,750,095 A | * | 3/1930 | Ewig | 37/818 |
| 3,772,805 A | * | 11/1973 | De Koning | 37/195 |
| 4,497,519 A | * | 2/1985 | Grable | 37/323 |
| 5,155,928 A | * | 10/1992 | Robertson et al. | 37/323 |
| 5,360,292 A | * | 11/1994 | Allen et al. | 37/323 |
| 5,775,836 A | * | 7/1998 | Dean, Jr. | 405/17 |
| 5,979,088 A | * | 11/1999 | Brouwer et al. | 37/335 |

* cited by examiner

Primary Examiner—David Bagnell
Assistant Examiner—Matthew J. Smith
(74) Attorney, Agent, or Firm—Fish & Richardson P.C.

(57) ABSTRACT

This invention relates to apparatuses and methods for subsurface mining, and more particularly to apparatuses and methods for relocating (including dredging, mining, filling, reverse-layering, replenishment) subsurface strata.

28 Claims, 9 Drawing Sheets

APPARATUS AND METHODS FOR SUBSIDENCE DEEPENING

BACKGROUND

This invention relates to apparatuses and methods for subsurface mining, and more particularly to apparatuses and methods for relocating (including dredging, mining, filling, reverse-layering, replenishment) subsurface strata.

Erosion is an increasing problem in land/water interfaces such a lakes, beaches, rivers, ponds, and estuaries. The loss of land to the oceans and lakes not only results in changes to the shoreline, but also results in underlying environmental alterations as well, including impacting the habitat of local wildlife on the land as well as marine life in the oceans and lakes. Current strategies to combat the erosion problem include transporting in replacement fill (e.g., sand, gravel, dirt), which is associated with enormous logistical costs including financial, transportation, and decreasing sources; off-shore dredging, which can adversely impact (usually irreversibly) the environment for the local wildlife and marine life, and is unpopular as well with local people, including resort areas, municipalities, and homeowners, and those such as fisherman, clammers and shrimpers whose trade is adversely impacted by such operations; and erection of physical barriers, which can ruin the aesthetic nature of the local area as well as adversely impact the inhabitation and environment of local wildlife and marine life.

A second increasing problem is the handling of contaminated (e.g., chemical, biological, radioactive) strata, both natural and man-made. Reports of contaminated land sites, lakes, ponds, and rivers, including the strata beneath them, are ever increasing. The remediation of such sites is typically very costly and labor intensive, which is exacerbated by the decision of what to do with the contaminated strata. Costs of transport and handling of such material is skyrocketing, and in many instances the danger of such materials is increased by the very processing, handling and transport of those materials. Additionally, as the volume of these materials (or at least their discovery) is increasing, the availability of suitable storage or disposal facilities and landfills willing and able to accept such materials is ever decreasing.

Because of the increasing complex interplay of environmental issues, health and safety issues, local aesthetic issues, local business issues, and burdensome financial and logistical issues relating to these two problems, there is a need for a more cost efficient, environmentally friendly, and logistically suitable system and process for addressing these issues than exists today.

SUMMARY

The invention relates to apparatuses and methods for relocating strata. The relocation (including dredging, mining, filling, reverse-layering, replenishment) can be for remediation purposes. The relocated strata can be subsurface strata that is used to replenish eroded areas, to bury contaminated areas, or for subsidence deepening, wherein lower layers of strata are relocated and the upper layers drop, thus filling the cavity resulting from removal of the relocated strata.

In one aspect, the invention is an apparatus (and methods of using it) for strata relocation comprising:

(a) a casing;
(b) water inlet piping;
(c) slurry outlet piping;
(d) a rotatable, side-angled pipe outlet in communication with the water inlet piping; and
(e) a support suitable for delivering the casing in a vicinity of the strata to be relocated.

In other aspects the apparatus is also those: wherein the slurry outlet piping further comprises a screen positionable internally within or externally from a casing; further comprising a water pump; further comprising a slurry pump; comprising two casings, each essentially disposed at opposite ends of the apparatus; wherein water inlet piping is disposed only through one casing (only) and slurry outlet piping is disposed through the other casing (only); wherein the water inlet piping is in communication with a water pump; wherein the slurry outlet piping is in communication with a slurry pump; wherein the slurry pump is a submersible pump; wherein water inlet piping and slurry outlet piping are disposed through each casing; wherein the water inlet piping is in communication with a water pump; or wherein the slurry outlet piping is in communication with a slurry pump.

In another aspect, the apparatus is that further comprising a water source for the water pump; that wherein the water source is a body of water located above the strata to be relocated; or that wherein the water source is an external water source.

In other aspects, the apparatus of the invention is that: further comprising a conduit for transferring relocated strata; or that wherein the conduit further comprises a sand sprinkler.

In another aspect, the invention is a method for strata relocation comprising:

(a) disposing a plurality of casings of the apparatus so as to be in communication with the strata for relocation;
(b) introducing water to the strata through water inlet piping having a rotatable, side-angled pipe outlet to produce a slurry of strata for relocation;
(c) removing the slurry from the original location of the strata through slurry outlet piping; and
(d) distributing the slurry to a location other than the original location of the strata.

In other aspects, the method above is that: wherein the distributing of the slurry comprises distribution using a sand sprinkler; wherein the water is introduced through both casings and slurry is withdrawn through both casings; wherein the water is introduced through one casing and slurry is withdrawn through the other casing; wherein the water inlet piping and the slurry outlet piping is disposed through both casings; wherein the water inlet piping is disposed through one casing and the slurry outlet piping is disposed through the other casing; wherein the slurry is used to bury contaminated sediments to reduce health risks; wherein the slurry is used to bury nutrient-enriched sediments to reduce aquatic plant regrowth; wherein the sediments are contaminated with polychlorinated biphenyls; wherein the sediments are contaminated with polyaromatic hydrocarbons; or wherein the sediments are contaminated with pesticides.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A–2C show top, side, and end views of the apparatus including floats, which are suitable for over-water applications.

FIGS. 3A–3C are schematics of configurations of the apparatus, including disposition of the pumps, pipings, and casings.

DETAILED DESCRIPTION

The apparatus herein can be used over bodies of water or over land. In either case, the apparatus can have anchor supports, for instance, I-beams that are disposed at positions on the apparatus and extend down to the floor of the site where strata relocation is performed. Particularly appropriate sites for the have underlying strata of fine to course sand, are free of surface boulders/cobbles or other obstructions; or have nutrient-rich or contaminated sediment layers of silt or soil.

Figure 1:
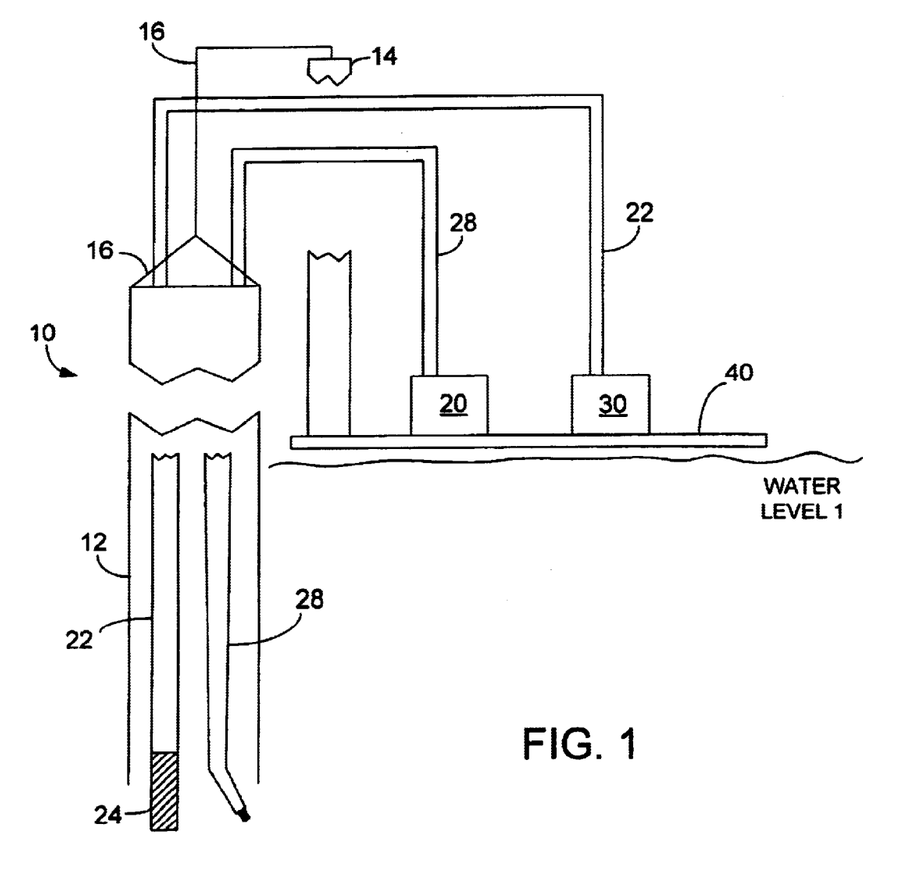
FIG. 1 shows an apparatus useful for strata relocation.

Referring to FIG. 1, apparatus 10 has a casing 12 that is delivered by way of support 14 and support lines 16 to a region to be relocated. The support 14 can be a frame (e.g., an A-frame) made of a suitable material (e.g., wood, metal, polymer) for supporting and delivering the casing. It can also include a system (e.g., a hydraulic system, winch, crane, cables, lines) for lifting and delivering the casing. Disposed within casing 12 is slurry outlet piping 22 (for relocation of the strata slurry), to which is attached screen 24. Also disposed within casing 12 is water inlet piping 28 (for introduction of water to the strata relocation site), to which is attached rotatable side-angled jet nozzle 26. Piping 22 is also attached to slurry pump 30, and piping 28 is attached to water pump 20. Support 14 and pumps 20 and 30 are positioned on barge 40. The pumps are suitable for controlling the flow of water introduced into the vicinity of strata being relocated, or slurry of strata from the original strata location to the new strata location. The pumps can be, for example, water pumps, suction pumps, or trash pumps. In the case of slurry withdrawal pumps (e.g., slurry pump), the pump is suitable for exposure to sand, dirt, rock, gravel, or other abrasive materials in the strata or slurry. Pumps suitable for use in the apparatuses and methods herein are readily available from commercial sources and include those available from Thompson Pump and Manufacturing Co., Inc. (e.g., models J156-6TW, and 6HT-DDS-4), Port Orange, Fla.; Liquiteck Industrial Sales Inc., Kirkland, QC Canada (e.g., CKX); or ITT-Goulds Pumps, Seneca Falls, N.Y.

The barge can include flotation devices (e.g., floats, pontoons) to allow the apparatus 10 to float on the body of water. The flotation devices should be of sufficient number, and provide sufficient buoyancy, to allow the apparatus to drive the casings to the vicinity of the site of the strata to be relocated. The disposition of the flotation devices on the barge also affects the stability of the barge on the water. For example, if a lesser number of flotation devices are used, to the extent they can be positioned further apart from one another (e.g., at opposite ends of the barge), greater stability of the barge is achieved relative to placing the flotation devices closer together to one another more centrally on the barge. The flotation devices can be made of any buoyant material (e.g., foam) covered by a protective material (e.g., polymer, metal, fiberglass), which are positioned underneath, or along the side of, the barge. Bolted or welded together steel tanks nonfilled with injected material may also be substituted, if the buoyancy is comparable.

The apparatus 10 uses one or more screens 24, simultaneously or sequentially, to segregate particle sizes for commercial sand/gravel supply of any natural deposit having a mixture of sizes. The screens can be of any suitable material, including stainless steel wrapped well screens with a slot separation selected based on the desired particle size to be transferred. The screen can also be in attached to, or in proximity of, piping that allows for introduction of freshwater (e.g., sand or sediment-free water) used to "back flush" the screen in order to clear, or prevent clogging of the screen with particulate matter, without having to lift the screen out of the relocation site.

The casing has a suitable diameter to accommodate the water inlet and slurry withdrawal piping, either each singly or together. The casing can be made of any suitable material for use in land or water applications. For example, in salt-water conditions, the casing must be stable to corrosive effects. Polyvinyl chloride (PVC) piping is one example of a suitable material for the casing.

The water inlet piping is any suitable piping for delivering water at the appropriate pressure to the strata relocation site. It is attached with suitable connectors (e.g., flanges, gaskets) to the water inlet pump. The slurry withdrawal piping can be flexible piping to allow for additional lowering of the screen, e.g., below the casing edge. Additional lines can be attached to the piping to allow for lifting and lowering of the piping above, as well as out of the casing for maintenance and changeout of piping mechanisms (e.g., connections, gaskets, flanges) as necessary. The piping should be suitable for transfer of slurries having a variety of sand, gravel, sediments, and the like. The piping is attached with suitable connectors (e.g., flanges, gaskets) to the slurry outlet pump.

Figure 2A:
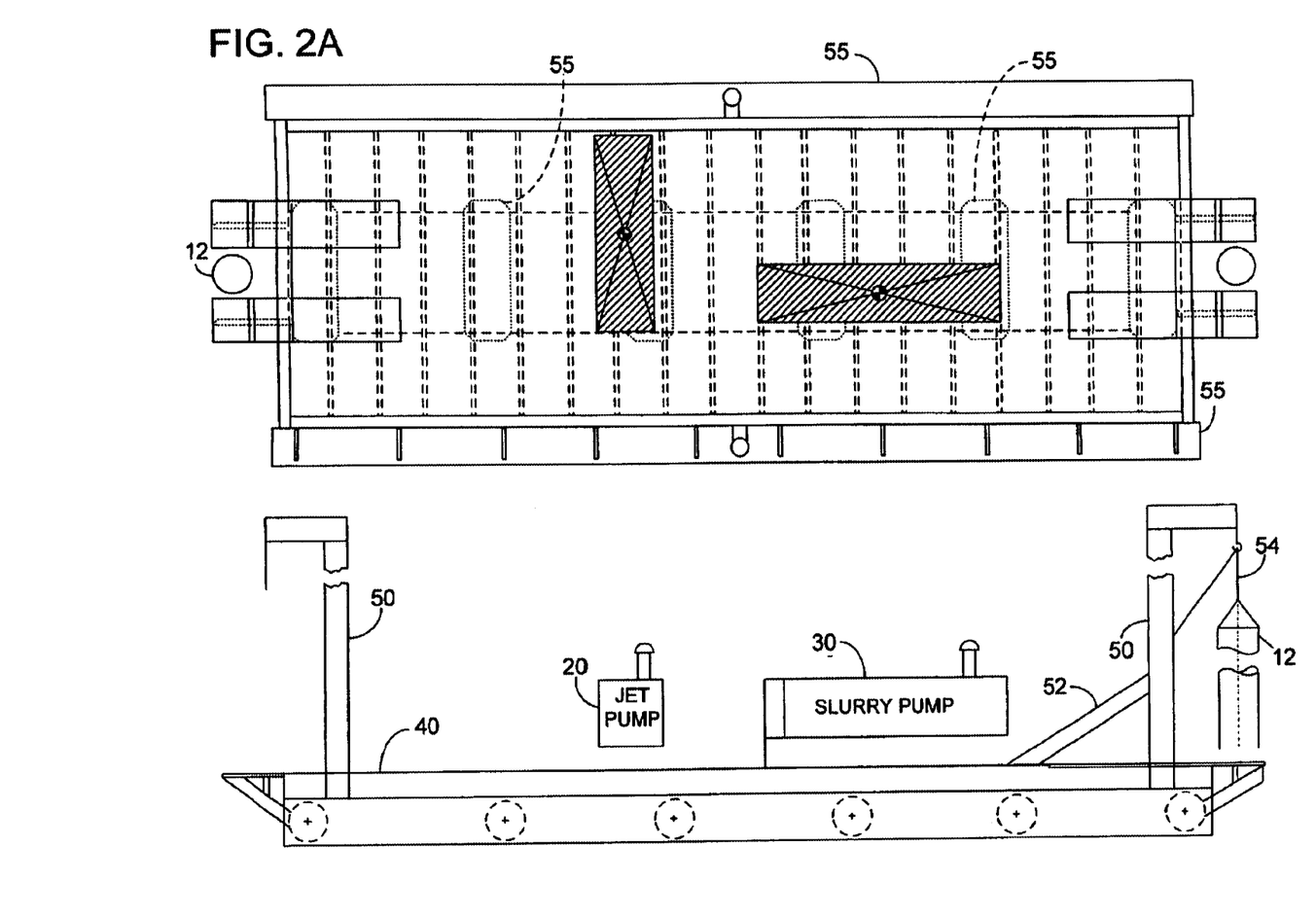
Figure 2B:
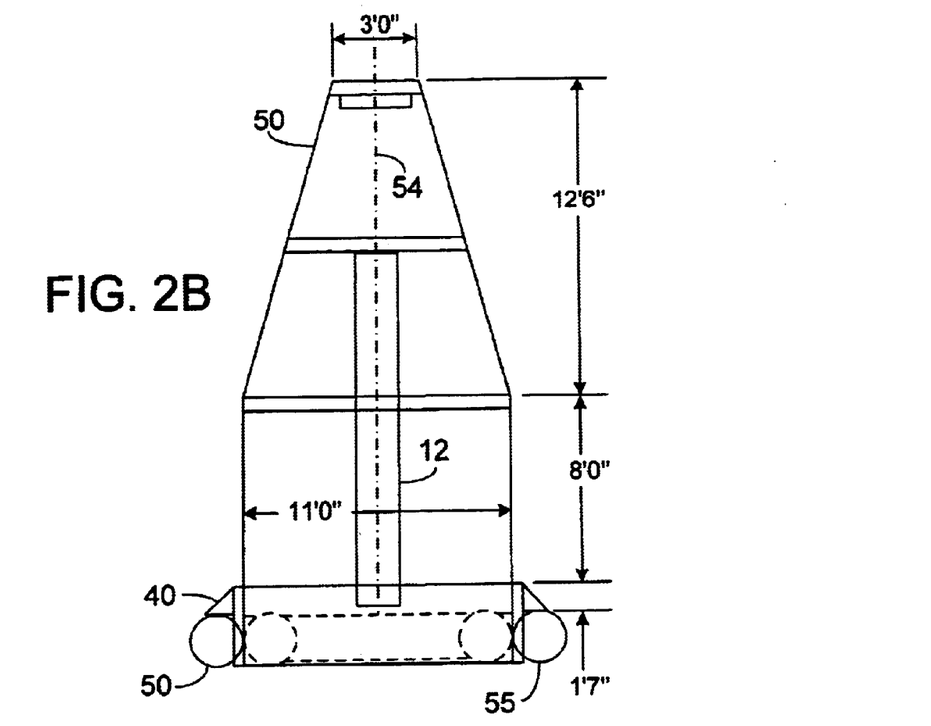

Referring to FIGS. 2A–2C, barge 40 has two A-frame supports 50, each located at opposite ends of barge 40. Each A-frame support can be further stabilized by support 52. Barge 40 supports pumps 20 and 30 that are centrally disposed on upper surface of the barge 40. Casing 12 is supported (and delivered to the strata) by support line 54, which is controlled by a winch (not shown) and supported over A-frame support 50. Floats 55 are located on the sides and underneath the barge (note that this schematic shows multiple floats underneath the barge although only are specifically numbered). This arrangement would generally include the items discussed in FIG. 1.

Figure 3A:
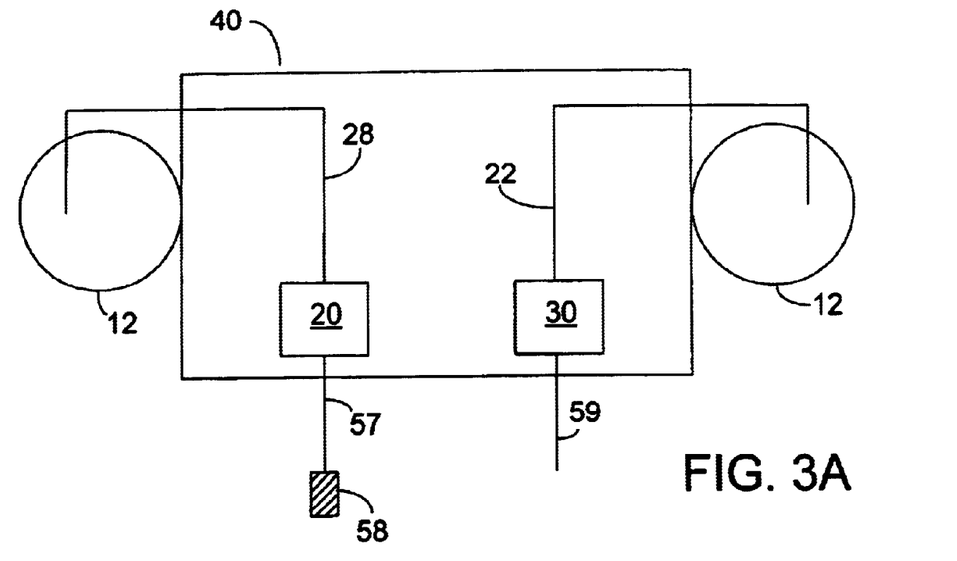

FIG. 3A illustrates another embodiment of the apparatus. Barge 40 has pumps 20 and 30 thereon. To pump 20 is attached water inlet piping 28 disposed within casing 12 only as well as inlet piping 57 (having screen 58 to filter out sand, gravel, or other particles) through which inlet water is transferred from a source to pump 20, then ultimately to the strata relocation site. To pump 30 is attached slurry withdrawal piping 22, which is disposed within the other casing 12, as well as discharge dredge pipe 59 for transfer of the slurry to the new location (or attachment to a sprinkler in other embodiments). In this configuration, one casing has the water inlet piping (i.e., introducing water to the relocation site), while the other casing has the slurry withdrawal piping disposed in it. This configuration is suitable for "trenching", or relocation of an area across the distance between the casings.

Figure 3B:
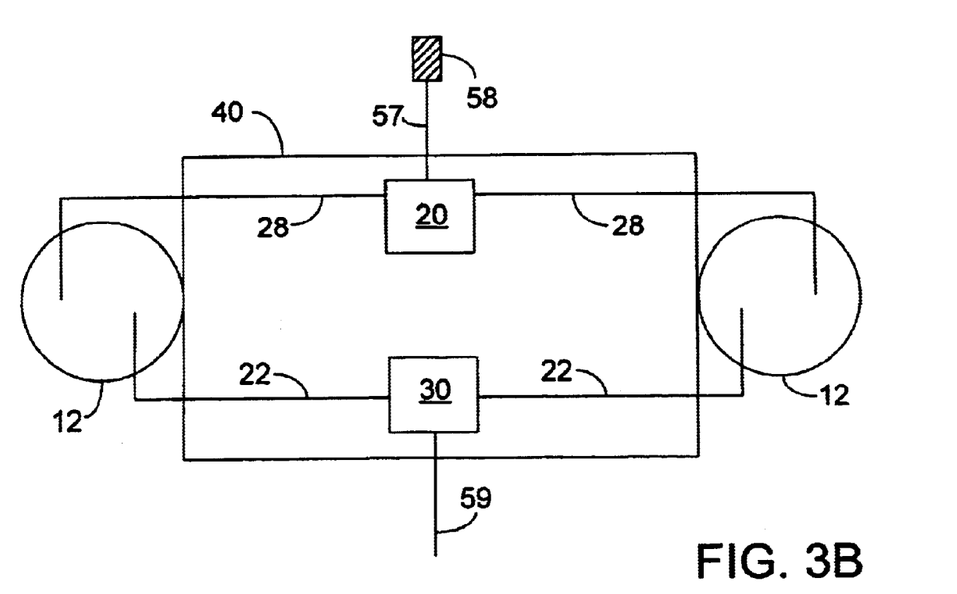

FIG. 3B illustrates another embodiment of the apparatus. Barge 40 has pumps 20 and 30 thereon. To pump 20 is attached water inlet piping 28 disposed within each casings 12, as well as inlet piping 57 (having screen 58 to filter out sand, gravel, or other particles) through which inlet water is transferred from a source to pump 20, then ultimately to the strata relocation site. To pump 30 is attached slurry withdrawal piping 22, which is disposed within each casing 12, as well as discharge dredge pipe 59 for transfer of the slurry to the new location (or attachment to a sprinkler in other embodiments). In this configuration, each casing has the water inlet piping (i.e., introducing water to the relocation site) and the slurry withdrawal piping disposed in it. This configuration is suitable for "crab-walking", or continuous repositioning of the apparatus while in operation.

FIG. 3C illustrates another embodiment of the apparatus. Barge 40 has pump 20 thereon. To pump 20 is attached water inlet piping 28 disposed within casing 12, as well as inlet piping 57 (having screen 58 to filter out sand, gravel, or other particles) through which inlet water is transferred from a source to pump 20, then ultimately to the strata relocation site. Pump 30 is a submersible pump disposed in casing 12. To pump 30 is attached slurry withdrawal piping 22, which is disposed within each casing 12, as well as discharge dredge pipe 59 for transfer of the slurry to the new location (or attachment to a sprinkler in other embodiments). In this configuration, one casing has the water inlet piping (i.e., introducing water to the relocation site), while the other casing has the slurry withdrawal piping disposed in it. This configuration is suitable for "trenching", or relocation of an area across the distance between the casings.

Figure 4:
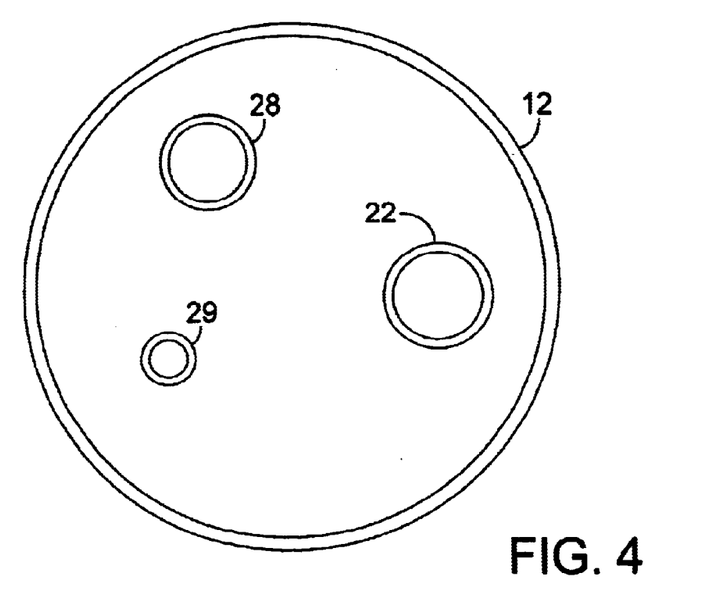
FIG. 4 shows a top view of a casing and piping assembly in the apparatus.

FIG. 4 is a top view schematic of a casing 12 having disposed within it water inlet piping 28, slurry outlet piping 22, and water inlet piping 29 (a secondary water inlet piping as a back flushing source).

Referring to FIGS. 5A–5E, the apparatus can include a sand sprinkler. Any of the rotatable sprinkler heads and sprinkler nozzles used as a sand sprinkler are also suitable for use as a rotatable jet nozzle (e.g., nozzle 26 in FIG. 1) for attachment to inlet water jet piping for introducing water to the vicinity of the strata to be relocated. Such rotatable jet nozzles, by virtue of their oscillation or rotation and the pressure of the water being introduced, contribute to provide improved mixing and agitation for producing a slurry for withdrawal and relocation.

The sand sprinkler receives the slurry of material being relocated, and distributes the material being relocated as a slurry or as dried strata (e.g., sand, dirt, gravel). The sprinkler is in communication with a conduit (e.g., piping) such that the slurry mixture from the slurry outlet piping is transferred via the conduit to the sprinkler. The sprinkler can be independently supported (e.g., barge, trailer). Various configurations of sand sprinklers are suitable, including a longitudinal bar (FIG. 5A), a cross bar (FIG. 5B), a 360° swivel (FIG. 5C), 180° swivel-return (FIG. 5D), or a 45° offset swivel (FIG. 5D), as delineated below.

Figure 5A:
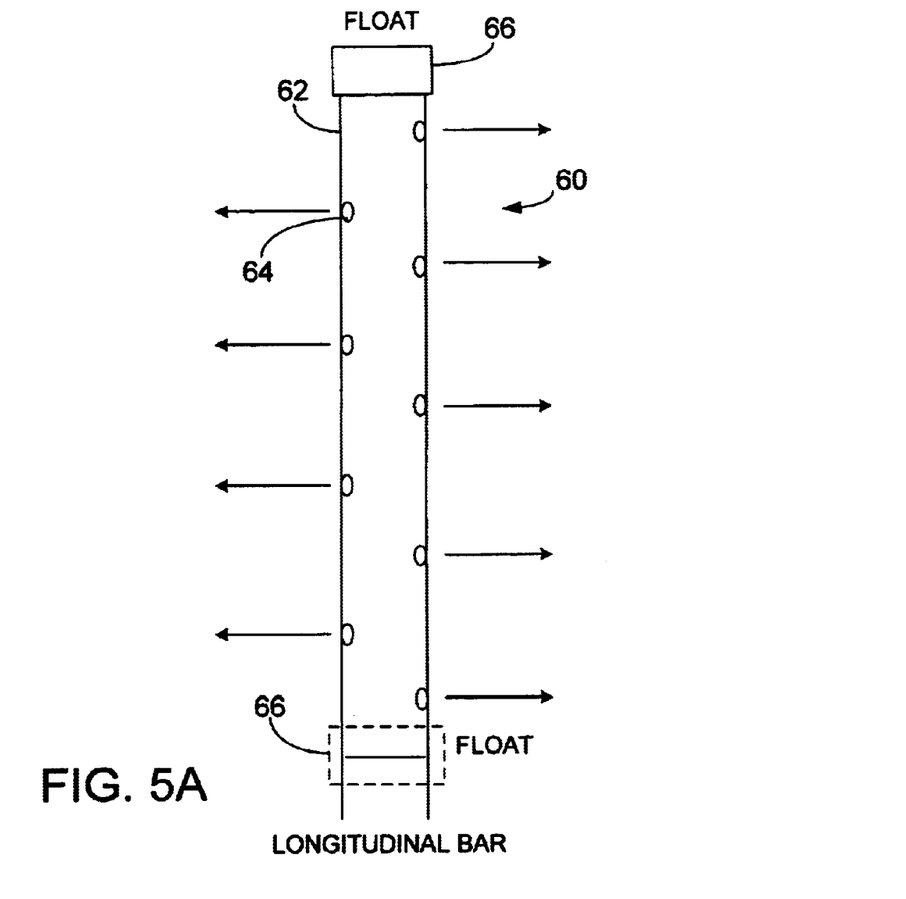
FIGS. 5A–5E is a schematic diagram of a sand sprinkler and sand sprinkler support.

Referring to FIG. 5A, a longitudinal bar sprinkler 60 includes a pipe 62 in the same axis as the conduit supplying slurry to the sprinkler head, the pipe having a plurality of holes 64 from which the slurry exits from the sprinkler in directions at essentially right angles to its axis. The pipe can be attached to floats 66 and 68 to support the sprinkler head in distribution applications over water.

Figure 5B:
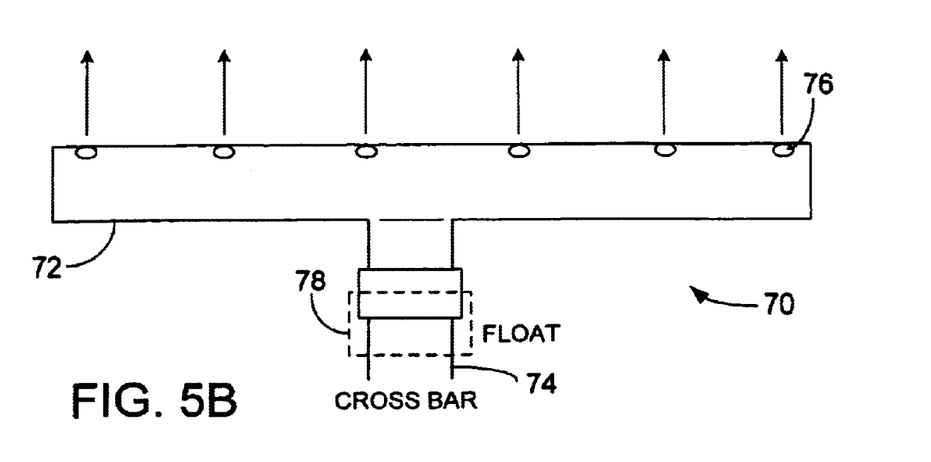

Referring to FIG. 5B, a cross bar sprinkler 70 includes a pipe 72 disposed at a 90° angle to the axis of the conduit 74 supplying slurry to the sprinkler head, the pipe 72 having a plurality of holes 76 from which the slurry exits from the sprinkler in directions at essentially the same direction and parallel to the axis of the conduit. In either sprinkler 62, 72, the pipe can be, for example, 4-inch diameter 80 PVC pipe with offsetting holes of about 0.5 inches in diameter. The pipe can be attached to float 78 to support the sprinkler head in distribution applications over water, and a silt net 88 can be placed around the discharge area to limit the horizontal displacement of the slurry.

Figure 5C:
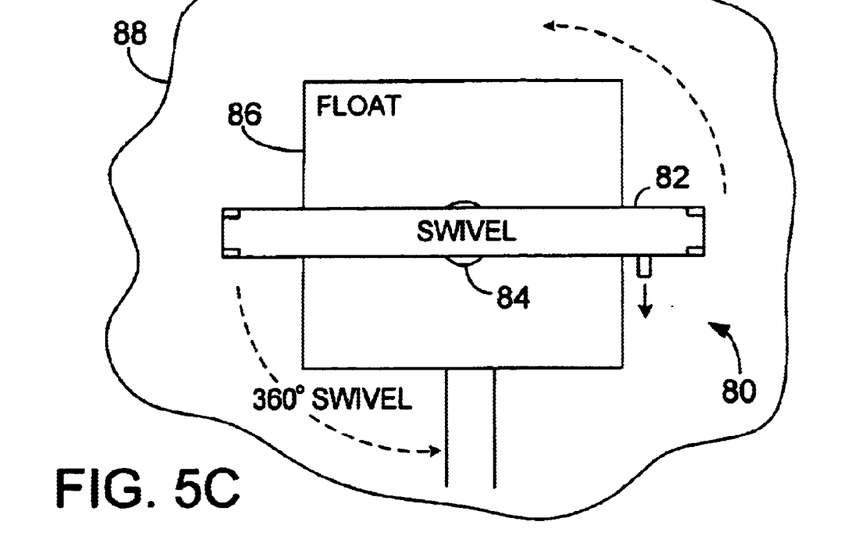
Figure 5D:
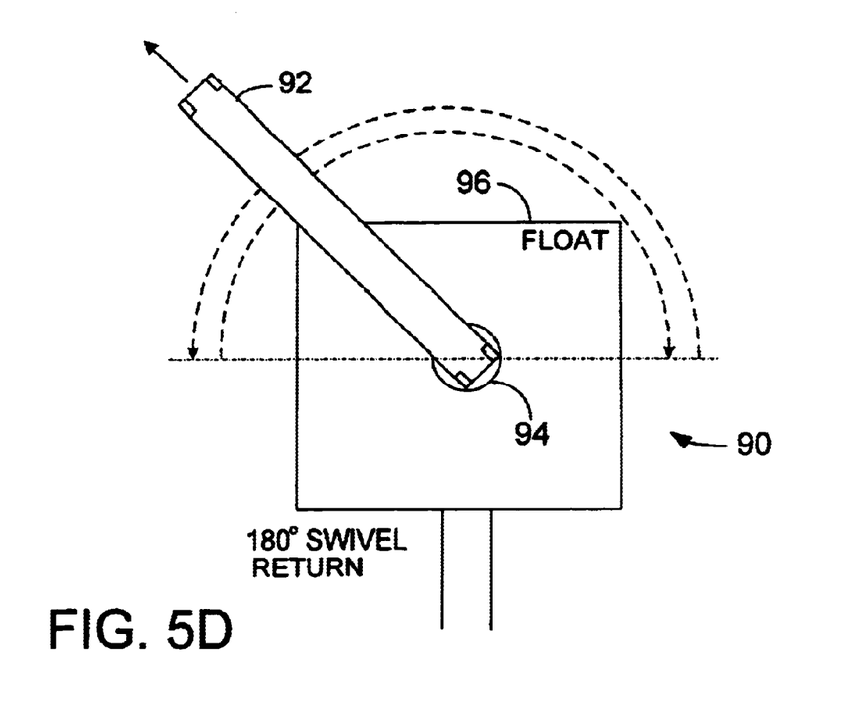
Figure 5E:
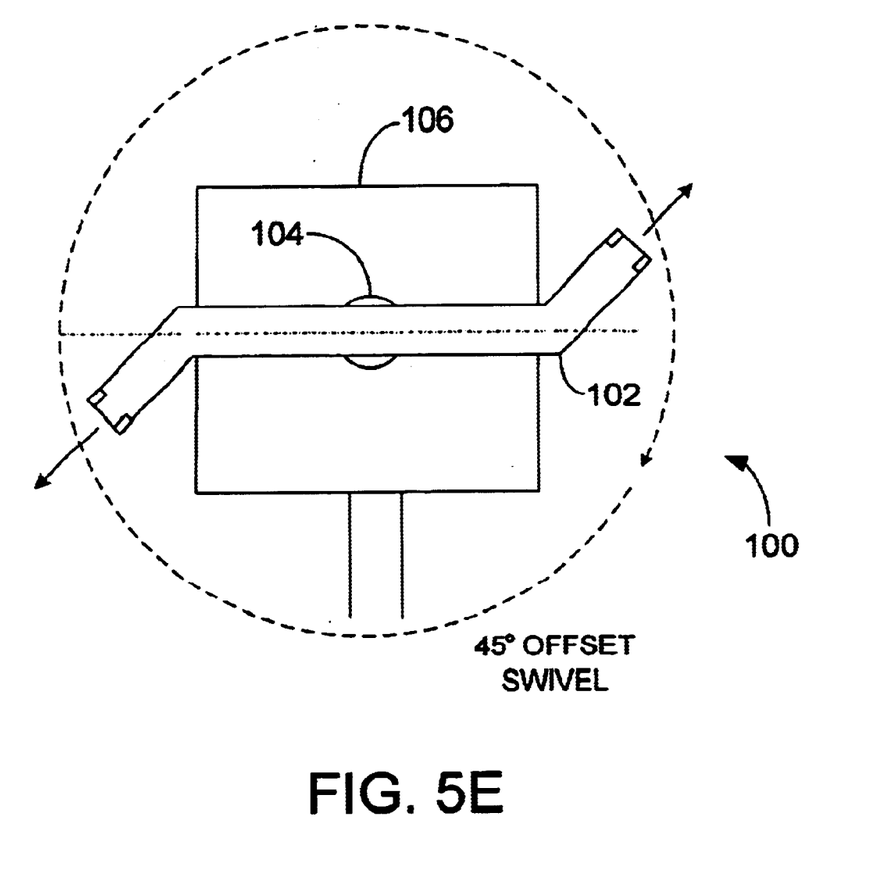

A swivel-type sprinkler head is rotatable, which motion results in even distribution of the slurry being relocated. One manner in which this can be accomplished is by placing one end of the tube in communication with a swivel joint. The swivel-type sprinkler heads can be self-propelled, including by placing propelling holes in the T-shaped tube such that the exit of the slurry jet from them is at a right angle relative to the axis of the tube. The propelling holes are typically of small diameter and can also be made adjustable in order to control the jet exiting the propelling hole and thus control the rotation speed of the sprinkler. Except for the slurry exiting the propelling holes, the slurry being relocated exits the sprinkler in a direction parallel to the axis of the two open ends of the T-shaped tube, and perpendicular to the direction of the axis of the end of the T-shaped tube attached to the swivel joint. One type is a 360° "circular sand jet sprinkler" 80, as illustrated in FIG. 5C. A 90° T-shaped tube 82 is in communication with a swivel mechanism 84 that allows the T-shaped tube to rotate 360°. The sprinkler can be supported by float 86. Another type is a 180° "sand jet sprinkler" 90, as illustrated in FIG. 5D. A 90° L-shaped tube 92 is in communication with a swivel mechanism 94 that allows the L-shaped tube 92 to rotate 180°, and then return, thus creating a back and forth motion. The sprinkler can be supported by float 96. Another type is a 45° "offset" sprinkler 100, as illustrated in FIG. 5E. A 45° "offset sprinkler" 100 is similar to the 360° "circular sand jet sprinkler" 80, except that the two ends of the T-shaped tube 102 are offset at a 45° relative to the axis of the tube. As the altered T-shaped tube 102 is in communication with a swivel mechanism 104 that allows the altered T-shaped tube 102 to rotate 360°, a full range of motion is achieved using this design. The sprinkler can be supported by float 106.

Figure 6:
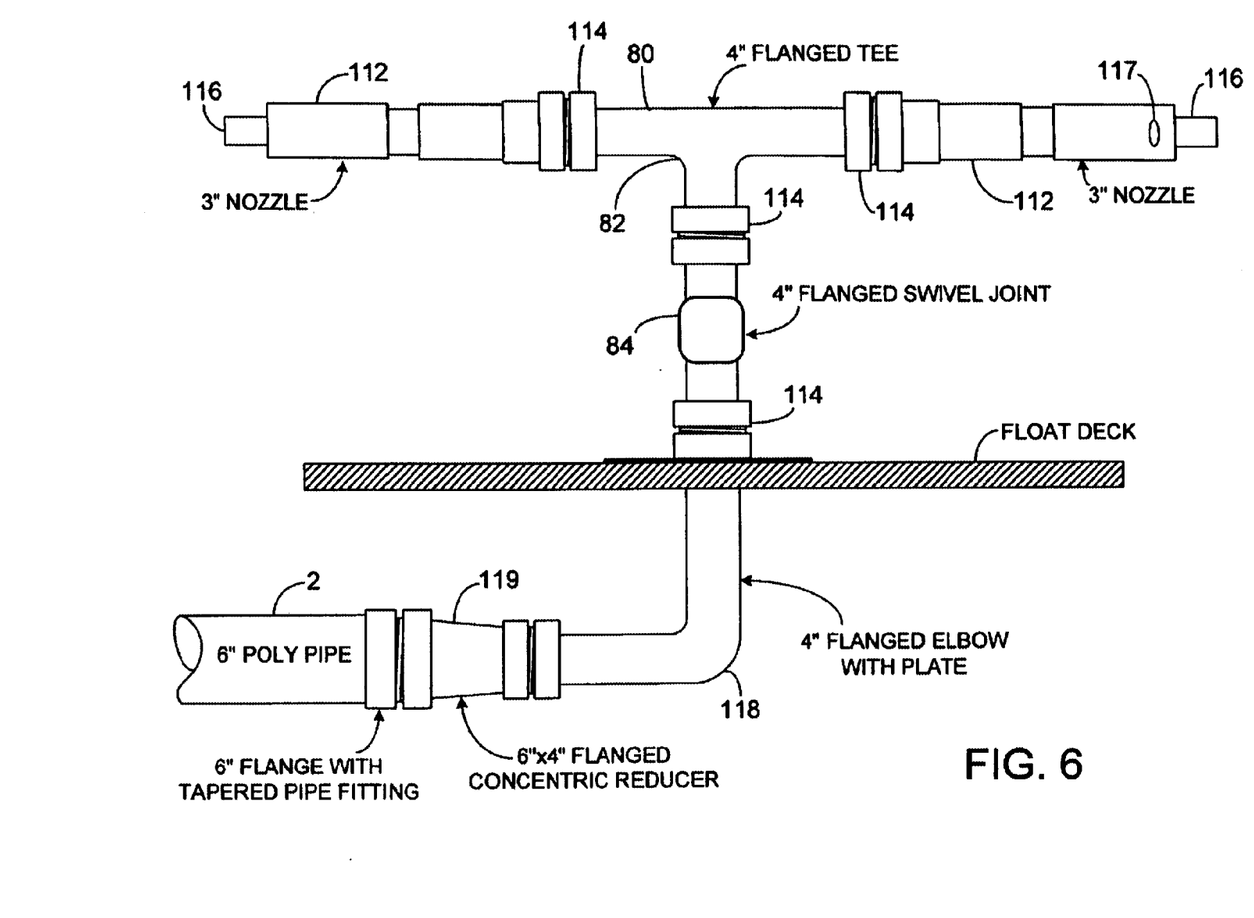
FIG. 6 is a schematic showing a sand sprinkler.

FIG. 6 is a more detailed schematic of a 360° "circular sand jet sprinkler" 80. The sprinkler is supported on a float deck 112. Sprinkler 80 has two nozzles 112 attached to T-shaped tube 82 by flanges 114. Each nozzle has an outlet port 116 and a small diameter propelling hole 117, which serves as an outlet for slurry jets used to drive the sprinkler head in a rotational direction. T-shaped tube 82 is attached to swivel mechanism 84 by flanges 114, which is also connected with flanged elbow 118 having a reducing flange 119 to connect it with slurry piping 22.

Figure 7:
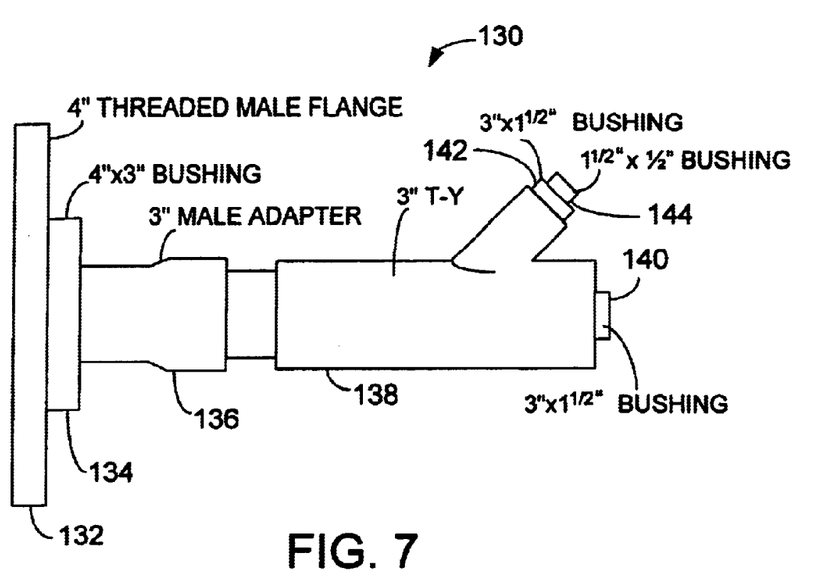
FIG. 7 is a schematic showing a jet nozzle (sprinkler nozzle).

The apparatuses include a rotatable, side-angled jet nozzle or outlet attached to the water inlet piping. FIG. 7 is a schematic of a jet nozzle, which is also suitable as a sand sprinkler nozzle. In FIG. 7, nozzle 130 includes a threaded male flange 132, attached to a bushing 134 that allows for connection of a smaller diameter connection. Bushing 134 is then attached to a smaller diameter male adapter 136, which is in communication with a T- or Y-tube 138. Tube 138 has a primary outlet having a bushing 140, which is adjustable in diameter by selection of an appropriate diameter bushing. Additionally, Y-tube 138 has a side-angled outlet that can be successively constricted in diameter (in order provide self-propelled rotation) by attachment of various diameter bushings 142 and 144. Although the jet nozzle depicted in FIG.

7 has a side-angle jet disposed at a 45° angle from the axis of the primary nozzle outlet, the nozzle can have the side-angle jet disposed at any angle suitable to create rotation of the nozzle (e.g., any angle between 0° and 90°). Such rotatable jet nozzles, by virtue of their oscillation or rotation and the pressure of the water being introduced, contribute to provide improved mixing and agitation for producing a slurry for withdrawal and relocation.

While the figures herein may delineate certain sizes of piping and connectors, these are to be construed to indicate relative relationship to one another. The sizes delineated in the figures provide certain pressures and relocation rates, which are also dependent in part on a number of other factors known to those in the art, including the diameter of the piping, connections, and outlets utilized and the speed and capacity of the pumps utilized. If higher rates of relocation are needed or desired, this can be accomplished by utilizing materials suitable for handling higher pressures, and/or by increasing the sizes of the pumps, piping, nozzles, connectors, and other parts of the apparatus commensurately.

The apparatuses described are suitable for strata relocation (e.g., mining, subsidence deepening, dredging) where the strata being relocated (e.g., sediment, sand, gravel, dirt, or mixtures thereof) are not "sealed" or intact, that is, where they may have holes or vertical pressure relief channels through them. In sealed systems, sufficient agitation may be achieved by jet pressure being introduced into the system. In unsealed systems, the loss of jet pressure adversely affects the agitation process. The apparatuses and methods herein overcome this problem by the generation of an agitated slurry using a rotating side-angled jet nozzle for inlet water introduction and the use of a screen that is adjustable along the axis of the casing and is suitable for positioning progressively lower beneath the casing as the bottom of the cavity deepens as strata relocation proceeds. By rotating a side-angled jet nozzle (attached to water inlet piping), the slurry of sand or dirt remains agitated and can be taken into the screen by maintaining a negative pressure (i.e., talking in more water than is being given). Once slurry production begins, the screen and inlet piping are slowly lowered to the strata being relocated. The control and balance of the water inlet velocity as well as the slurry withdrawal velocity in the methods herein affect the efficiency of the process, and are controlled, in part, by the pumps.

Sources of water for introduction to the strata relocation area include overlying bodies of water (e.g., lakes, oceans, bays, rivers, ponds) or an external source such as a well, or tank (e.g., tanker truck transported in) for applications where the relocation strata is under land rather than water. In one aspect for land application, the water source can be an underground reservoir such that when the slurry is relocated to a drawing reservoir, the sand/gravel settles out and the water in the slurry infiltrates back to groundwater, thus recycling and replenishing the source.

Operation of the apparatus is useful where the strata being relocated is beneath a body of water (e.g., lakes, oceans, bays, rivers, ponds, estuaries, marshes) or where the strata being relocated are beneath land. The apparatus can be used in any of the following situations: i) wherein the strata being relocated is placed on the site of removal, but located above the original position of the strata being relocated; ii) wherein the strata being relocated is placed other than on top of the site of removal of the strata being relocated; iii) wherein the strata being relocated is placed adjacent to the site of strata relocation. In land applications, the apparatus can be supported on a truck for easy positioning of the apparatus.

The apparatus can be used for any strata relocation, including where the strata relocation is for the purpose of beach replenishment (e.g., the barge is moved along the shoreline and the sand sprinkler positioned to distribute the sand along the beach); where the area above the strata being relocated is contaminated; where the area above the strata being relocated is contaminated with organic materials; where the area above the strata being relocated is contaminated with polychlorinated biphenyls, polyaromatic hydrocarbons, or pesticides (e.g., AROCHLOR, AROCHLOR Series 1260 or 1254, PHENOCHLOR, HEPTACHLOR, DDT, LINDANE, METHOXYCHLOR, ENDRIN, CHLORDANE, naphthalenes, anthracenes, fluoranthenes, pyrones, dioxins); where the area above the strata being relocated is contaminated with noxious (e.g., anaerobic) materials; where the area above the strata being relocated is nutrient-rich (thereby enhancing the excessive proliferation of vegetation, leading to an imbalance in the local ecosystem); where the area above the strata being relocated is contaminated with heavy metals (e.g., copper, cadmium, lead, selenium, arsenic, mercury, chromium).

The apparatus can be used with a number of relocation procedures, including wherein the strata relocation remediates contaminated strata; wherein the strata relocation buries contaminated strata; wherein the strata relocation is performed such that the surface vegetation of the relocation site is essentially retained relative to prior to the relocation (but closer to water table depths); wherein the strata relocation is performed such that the wildlife and marine life habitation of the relocation site is essentially retained relative to prior to the relocation; and wherein the strata relocation is performed while essentially retaining the upper stratigraphy above of the relocation site relative to prior to the relocation (e.g., the strata layers directly above the relocated strata layer drop, but are maintained in the same relationship relative to one another). In relayering applications, the clean sand relocated over the contaminated (or nutrient rich) strata serves as a barrier to leaching or suspension of contaminants (e.g., nutrients, heavy metals, organics) into overlying waters or land. The net effect of such procedures is that the soil column neither loses material (i.e. dredging) nor receives new material (i.e., filling) during the operation. One layer (lower) is transferred to the uppermost position of the soil column with essentially overall retention of site strata volume.

In one embodiment, the apparatus discharges the slurry at a rate of between about 100 to 1100 gallons per minute (gpm); wherein the strata is relocated at a rate of between about 22 to 535 cubic yards of sand (e.g., earth, dirt, gravel, or mixture thereof) per day; and wherein the introduction of water is at a rate of between 300–4000 gal/minute; and wherein the removal of the slurry from the strata location is at a rate of between 200–2500 gal/min.

Screening of the strata for relocation can be used to provide a slurry of strata having a selected particle size range (e.g., between 20 to 100 thousandths of an inch or 100 to 250 thousands of an inch), which are useful for relocations where separation of strata by particle size is desired, for example, in beach replenishment operations, where particular sized grains are desired.

The apparatus can include a plurality of casings. Also, the apparatus can be operated continuously over the site of strata relocation, which allows for methods of strata relocation where continuous operation of the apparatus is possible. That is, the apparatus can be operated such that two (or more) casings delivered to the vicinity of the strata for relocation are in operation having inlet water and outlet slurry being transferred through, then while keeping one casing stationary, the other casing is lifted, the platform repositioned such that the lifted casing is moved forward relative to the stationary casing, whereupon the lifted casing is redelivered in the vicinity of strata to be relocated and inlet water and out slurry are again transferred through. The process is repeated with the formerly stationary casing being moved while the formerly lifted casing is held stationary. Repeating this process now provides for "continuous" operation (that is, the pumping and withdrawal process need not be halted to move a single casing), in which the overall movement of the apparatus appears to resemble a "crab-walk". The barge can be self-powered (e.g., motor), or can be moved manually (e.g., by ropes, tug boat, truck, man, animal).

The apparatus and methods herein can also include extension casings, which are added (either while stopped or during operation) in order to allow continued driving of the casing deeper into the strata relocation vicinity as operations progress. For example, additional casing (e.g., 3 foot lengths) are cut longitudinally in half and sets of hinges can be attached to both halves in order to allow closing of the casing length back together again. Thus, while operations are in progress the extension casing can be placed around the piping already disposed in the original casing, hinges latched so the extension surrounds the piping, and then the extension casing can be fixed (e.g., bolted) to the original casing. The entire casing (original plus extension) can then be further lowered in the relocation site thus avoiding having to withdraw the original casing and reinsert longer casing. This can be done iteratively as additional extensions are needed.

When an apparatus having two (or if more, an even number) of casings is utilized, and only one casing includes inlet piping (and associated outlets, heads, connectors, etc.), and only the other casing includes slurry outlet piping (and associated screens, outlets, connectors, etc.), the methods of operation using this configuration of the apparatus result in formation of a trench cavity. That is, a cavity that spans the distance between the two casings. This operation can be advantageous in certain situations.

In order that the invention described herein may be more readily understood, the following examples are set forth. It should be understood that these examples are for illustrative purposes only and are not to be construed as limiting this invention in any manner. All references cited herein are expressly incorporated by reference in their entirety.

EXAMPLES

Apparatus Arrangement

In one embodiment, the apparatus is a barge having water inlet and slurry withdrawal pumps positioned near the center of the barge deck to allow east disconnects of inlet or withdrawal assemblies. In one configuration, two sets of water inlet pipes are connected to the water pump, a primary 3-inch (diameter) inlet piping hose and a secondary 1.5-inch (diameter) flushing line. The flushing line is connected to a 1-inch line below the sand intake screen (which can be attached to withdrawal piping). This provides a back flush to the sand intake screen to free up attached gravel and/or shells (fossil shells), should they clog or impede the sand intake screen. A manifold with valves and push-on quick disconnects (readily available from commercial sources, including for example, Flowline Components Inc., Baltimore, Md.; Airmo Inc., Minneapolis, Minn.) is attached to the discharge of the water pump for ease of switching water flows on and off. A large quick-disconnect (6 in. aluminum) is used for slurry intakes. Slurry withdrawal piping is 6 inches in diameter and about 35 feet on-deck length and an additional 20 feet for extension down into the casing to the strata. Two long (20-ft) ladders are placed at each end of the barge to allow attachment of cables to a nylon strap stirrup at the top of each 2-ft. diameter PVC casing. A hydraulic generator is placed near the west end of the slurry pump to provide power through control stations at the east and west ends to drive cable winches for lifting and lowering casings, water inlet piping, slurry outlet piping (including the screen), and I-beam anchors if present.

Slurry Load Determination

A sample of water/sand slurry is taken from a 1.5-inch discharge line attached to a slurry withdrawal centrifugal outlet. Slurry loads of about 5% to about 20% are deemed satisfactory. The percentage is determined by comparing the depth of sand, after settling, to the initial depth of water on a scaled measuring container. If the slurry load exceeds about 40%, additional water is introduced to the slurry mixture to bring the percentage down to at least 30% or lower. As appropriate.

Pump Speed/Output

When the apparatus herein is used with the water inlet pump operating at 1500 rpm and the sand slurry pump operating at about 110 rpm, approximately 40 cubic yards of strata is relocated each 3-hour operating day. Increasing the water inlet pump to 2000 rpm and the sand slurry pump to 1500 rpm achieves a relocation of approximately 10 cubic yards of strata in a 6-hour operating day. At this level 10 gallons/minute of inlet water is introduced and about 6000 gallons/minute of slurry flow is achieved.

A number of embodiments of the invention have been described. Nevertheless, it will be understood that various modifications may be made without departing from the spirit and scope of the invention.

What is claimed is:

1. An apparatus for strata relocation comprising:

casing;

water inlet piping;

slurry outlet piping substantially disposed within the casing and positionable independently of the casing;

a rotatable, side-angled pipe outlet in communication with the water inlet piping;

a support suitable for delivering the casing in a vicinity of the strata to be relocated; and a conduit for transferring removed relocated strata, the conduit coupled to the slurry outlet pipe, with the casing, water inlet and outlet piping arranged to remove strata from under a formation and relocate the removed strata over the formation.

2. The apparatus of claim 1, wherein the slurry outlet piping further comprises a screen positionable internally within or externally from the casing.

3. The apparatus of claim 1, further comprising a water pump.

4. The apparatus of claim 1, further comprising a slurry pump.

5. The apparatus of claim 4, wherein the slurry pump is a submersible pump.

6. The apparatus of claim 1, comprising two casings, each disposed at opposite ends of the apparatus.

7. The apparatus of claim 6, wherein water inlet piping is disposed through one casing only and slurry outlet piping is disposed through the other casing only.

8. The apparatus of claim 7, wherein the water inlet piping is in communication with a water pump.

9. The apparatus of claim 7, wherein the slurry outlet piping is in communication with a slurry pump.

10. The apparatus of claim 6, wherein water inlet piping and slurry outlet piping are disposed through each casing.

11. The apparatus of claim 10, wherein the water inlet piping is in communication with a water pump.

12. The apparatus of claim 10, wherein the slurry outlet piping is in communication with a slurry pump.

13. The apparatus of claim 1, further comprising a water source for the water pump.

14. The apparatus of claim 13, wherein the water source is a body of water located above the strata to be relocated.

15. The apparatus of claim 13, wherein the water source is an external water source.

16. The apparatus of claim 1, wherein the conduit further comprises a sand sprinkler.

17. The apparatus of claim 16, wherein the sand sprinkler comprises a bar sprinkler comprising a sprinkler pipe having a plurality of holes through which slurry exits the sprinkler.

18. The apparatus of claim 17, wherein an egress portion of the sprinkler pipe is substantially aligned with the conduit.

19. The apparatus of claim 17, wherein an egress portion of the sprinkler pipe is disposed at an angle of approximately 90 degrees to the conduit.

20. The apparatus of claim 16, wherein the sand sprinkler comprises a swivel-type sprinkler head.

21. The apparatus of claim 20, wherein the swivel-type sprinkler head comprises a T-shaped tube with two open ends of the T-shaped tube rotatable through 360 degrees.

22. The apparatus of claim 21, wherein the two open ends of the T-shaped tube and a portion of adjacent pipe are disposed at an angle to a top portion of the T-shaped tube.

23. The apparatus of claim 20, wherein the swivel-type sprinkler head comprises an L-shaped tube attached to the conduit by a base of the tube with a rotatable open end of the L-shaped tube.

24. The apparatus of claim 1, wherein the casing comprises polyvinylchloride pipe.

25. The apparatus of claim 1, wherein the casing comprises metal pipe.

26. The apparatus of claim 1, wherein the casing further comprises extension casing segments capable of being assembled around slurry outlet piping.

27. The apparatus of claim 1 wherein the support includes a system for delivering the casing to the strata to be relocated.

28. The apparatus of claim 27, wherein the system for delivering the casing comprises a hydraulic system for driving the casing to the strata to be relocated.

* * * * *